UNITED STATES PATENT OFFICE.

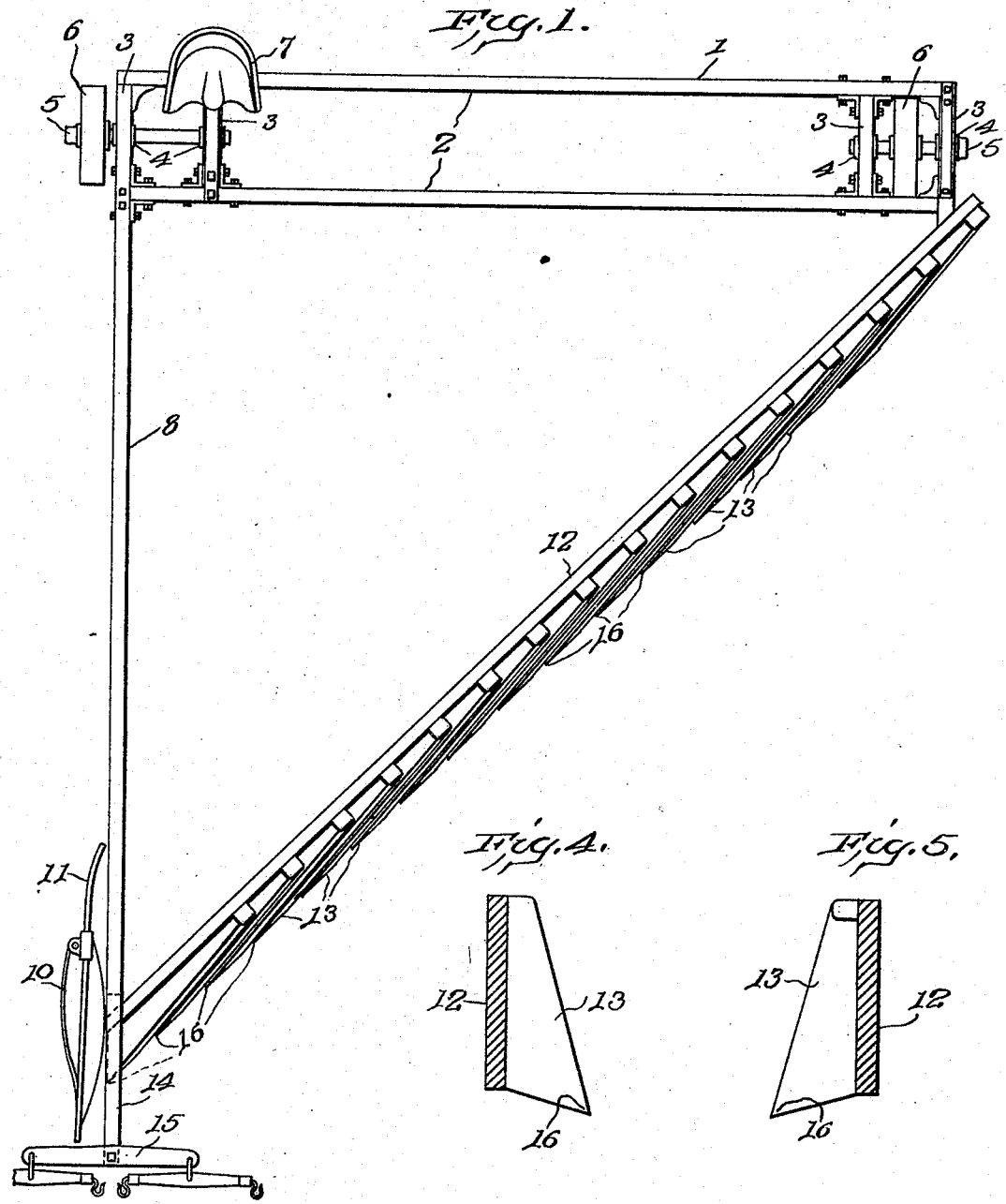

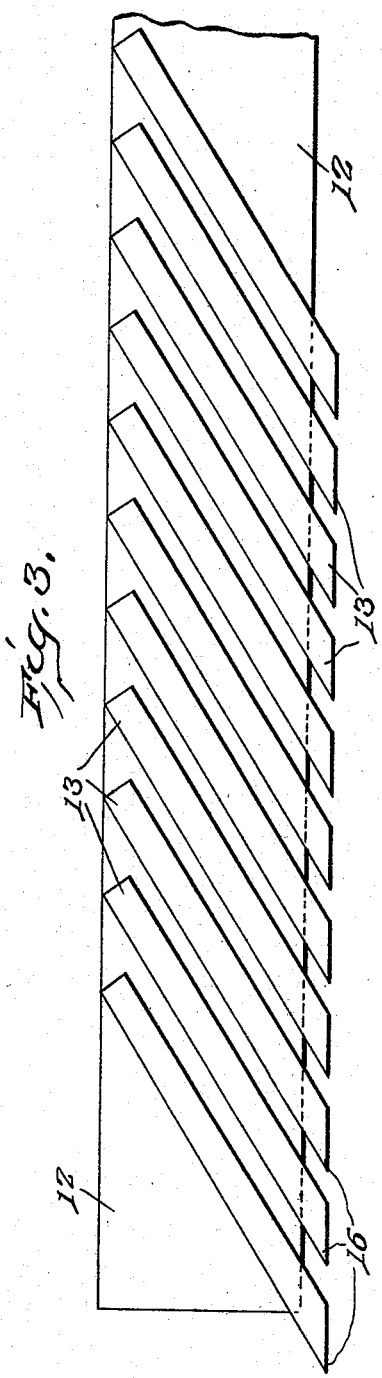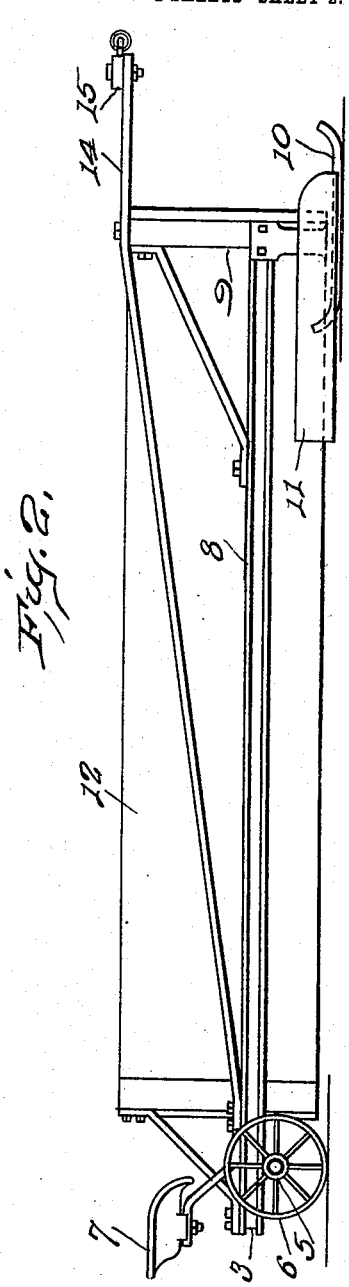

JOHN H. KOBELANZ, OF SPRINGFIELD, OHIO.

HAY-RAKE.

937,076.

Specification of Letters Patent. Patented Oct. 19, 1909.

Application filed July 27, 1908. Serial No. 445,497.

*To all whom it may concern:*

Be it known that I, JOHN H. KOBELANZ, a citizen of the United States, residing at Springfield, in the county of Clark and State of Ohio, have invented certain new and useful Improvements in Hay-Rakes, of which the following is a specification, reference being had therein to the accompanying drawings.

This invention relates to hay rakes, and the object of the invention is to provide a rake of this character which will bundle or roll the hay into a continuous windrow and will deposit this windrow at one side of the rake without interrupting its progress; and further, to construct the rake in a simple manner, whereby a strong, durable rake may be produced at a low cost.

With these objects in view my invention consists in certain novel features and in certain combinations and arrangements of parts to be hereinafter described, and then more particularly pointed out in the claims.

In the accompanying drawings, Figure 1 is a top plan view of a rake embodying my invention; Fig. 2 is a side elevation of the same; Fig. 3 is a detail view of the tooth-supporting member; and Figs. 4 and 5 are detail views of one of the teeth.

In these drawings I have illustrated the preferred form of my invention and have shown the same as comprising a frame having a tooth-supporting member, that is, a member forming the rake proper, arranged at an inclination to the line of draft of the frame as a whole. This frame is preferably substantially triangular in shape consisting of a transverse member 1 formed of two bars 2 united at their opposite ends by connecting members 3 provided with bearings 4 adapted to receive the axles 5 of the ground wheels 6. A seat 7 is also mounted on one of the cross members 3. A forwardly extending member 8 is secured to one end of the transverse member 1 and extends a considerable distance in front of the same where it is provided with an upwardly extending standard 9 having secured to the lower end thereof a shoe or runner 10 which supports the forward end of the frame. A grain board 11 may also be secured to this upright member 9 if so desired.

The grain-supporting member or rake proper 12 extends from the forward end of the side member 8 to the opposite end of the transverse member 1 and forms the hypotenuse of the triangle. This tooth-supporting member may be of any suitable construction, but I prefer to form the same of a plank supported edgewise and having its front face in a substantially vertical plane. A plurality of teeth 13 are secured to the vertical face of the tooth-supporting member 12. These teeth may be of any suitable construction and may be formed of any suitable material, such as metal or wood. The teeth are spaced some distance apart and may be arranged at any desired angle to the tooth-supporting member 12, but I prefer to form the teeth of a length considerably greater than the height of the member 12 and to arrange the teeth at an acute angle to the length of said member. This angle may be varied according to the different requirements of various uses, but I have, in the present instance, shown the same as arranged at an angle of about forty-five (45) degrees to the member 12. As stated, the teeth 13 may be constructed in any approved manner, but I prefer to form the same in the manner shown in the drawings in which each tooth comprises a body portion of substantially the same width throughout its length and having its thickness at its upper end substantially equal to the width thereof, but increasing toward the lower end of the tooth. The lower end of the tooth is cut away or beveled at an angle to the body portion thereof corresponding to the angle at which the tooth is arranged relatively to the supporting member 12, thus causing the bottom of the tooth to extend substantially parallel with the lower edge of the supporting member and with the surface of the ground. Further, if desired, the lower end of the tooth may be cut away in such a manner as to cause the same to extend downwardly and outwardly, thereby forming a forwardly and downwardly extending point 16 on the outer or forward corner of the tooth, which point will extend beneath the hay and raise the same from the ground.

Suitable draft mechanism is provided at the forward angle of the triangular frame, preferably consisting of a forwardly extending portion 14 of the side member 8, which forwardly extending portion extends some distance in front of the forward angle of the frame and is provided near its outer end with a suitable shaft hitch 15.

When the rake as a whole is propelled forwardly by means of the draft hitch 15, the points 16 of the teeth 13 will be moved beneath the hay as it lies upon the ground in swaths and it will be raised upwardly along the teeth 13 and rolled over upon itself as the rake moves forward, thus rolling the same into a bundle which will be deposited in a continuous windrow at the end of the rake. Further, it will also be apparent that the rake is very simple of construction and can be readily constructed of materials easily obtained and is of a strong, durable construction having no moving parts or complicated mechanisms to become disarranged or broken.

I wish it to be understood that I do not desire to be limited to the details of construction shown and described, for obvious modifications will occur to a person skilled in the art.

Having thus fully described my invention, what I claim as new and desire to secure by Letters Patent, is:—

1. A hay rake of the character described comprising a frame having one of its members substantially horizontal and inclined relatively to the line of draft, and a plurality of teeth secured to said inclined member, each of said teeth having one face arranged in a substantially vertical plane, said teeth having their lower ends provided with forwardly extending points.

2. A hay rake of the character described comprising a frame having one of its members inclined relatively to the line of draft and provided with a substantially vertical face, and a plurality of teeth secured to said face.

3. A hay rake of the character described comprising a frame having one of its members inclined relatively to the line of draft and provided with a substantially vertical face, and a plurality of teeth secured to said face and arranged at an acute angle to said inclined member.

4. A hay rake of the character described comprising a frame having one of its members substantially horizontal and arranged at an acute angle to the line of draft, and a plurality of teeth secured to said inclined member and extending at an acute angle thereto, and each of said teeth having one face arranged in a substantially vertical plane.

5. A rake of the character described comprising a substantially triangular frame, the forward member of said triangle extending at an inclination to the line of draft of said frame, and a plurality of teeth secured to said forward member at an acute angle to the length thereof.

6. In a rake of the character described, a frame comprising a transverse member and a side member arranged at substantially right angles thereto, a supporting member connecting the outer ends of said transverse member and said side member, and a plurality of teeth rigidly secured to said supporting member in substantially the same vertical plane and at an acute angle to the length of said member.

7. In a device of the character described, a frame comprising a transverse member, a side member, and a supporting member extending between the outer ends of said transverse member and said side member and having a vertical face, and a plurality of teeth rigidly secured to said vertical face at an acute angle to the length of said supporting member.

8. In a rake of the character described, a frame comprising a transverse member and a side member extending at substantially right angles thereto, a supporting member extending between the outer ends of said transverse member and said side member, a plurality of teeth secured to said supporting member at an angle to the length thereof, ground wheels secured near the opposite ends of said transverse member, a support for the forward end of said frame, and a draft hitch connected to said frame near the forward angle thereof.

9. A hay rake of the character described comprising a frame having one of its members inclined relatively thereto, and a plurality of teeth secured to said inclined member and arranged at an acute angle to the length thereof, each of said teeth comprising a body portion of substantially uniform width and of a gradually increasing thickness from the upper end toward the lower end thereof.

10. A hay rake of the character described comprising a frame having one of its members inclined relatively thereto, and a plurality of teeth secured to said inclined member and arranged at an acute angle to the length thereof, each of said teeth comprising a body portion of substantially uniform width and of a gradually increasing thickness from the upper end toward the lower end thereof, and having its lower end substantially parallel with the lower edge of said supporting member.

11. A hay rake of the character described comprising a frame having one of its members inclined relatively thereto, and a plurality of teeth secured to said inclined member and arranged at an acute angle to the length thereof, each of said teeth comprising a body portion of substantially uniform width and of a gradually increasing thickness from the upper end toward the lower end thereof and having its lower end cut away to form a downwardly and forwardly extending point.

12. A hay rake of the character described comprising a frame, a plurality of teeth secured to one of the members of said frame, each of said teeth comprising a body portion of substantially uniform width and of a gradually increasing thickness from the upper end to the lower end thereof.

In testimony whereof, I affix my signature in presence of two witnesses.

JOHN H. KOBELANZ.

Witnesses:
  ELZA F. MCKEE,
  EDWARD L. REED.